United States Patent [19]
Cahill et al.

[11] Patent Number: 6,021,272
[45] Date of Patent: Feb. 1, 2000

[54] TRANSFORMING AND MANIPULATING PROGRAM OBJECT CODE

[75] Inventors: Conor P. Cahill, Ashburn; David E. Wexelblat, Vienna; Edmund R. Matthews, Winchester, all of Va.; Dirk H. Hohndel, Badsoden, Germany; Ning Zhang, Herndon, Va.

[73] Assignee: Platinum Technology, Inc., Oakbrook Terrace, Ill.

[21] Appl. No.: 08/538,961

[22] Filed: Oct. 4, 1995

[51] Int. Cl.⁷ ...................................................... G06F 9/45
[52] U.S. Cl. ............................ 395/705; 395/704; 395/707
[58] Field of Search .................................... 395/705, 704, 395/183.11, 183.14, 707

[56] References Cited

U.S. PATENT DOCUMENTS

| | | | |
|---|---|---|---|
| 4,694,420 | 9/1987 | Pettet et al. .............................. | 364/900 |
| 5,193,180 | 3/1993 | Hastings .................................. | 395/710 |
| 5,335,344 | 8/1994 | Hastings ............................. | 395/183.11 |
| 5,450,575 | 9/1995 | Sites ....................................... | 395/707 |
| 5,539,907 | 7/1996 | Srivastava et al. ..................... | 395/700 |
| 5,590,331 | 12/1996 | Lewis et al. ............................. | 395/708 |

FOREIGN PATENT DOCUMENTS

| | | | |
|---|---|---|---|
| WO 93/00633 | 1/1993 | WIPO ............................. | G06F 11/34 |

OTHER PUBLICATIONS

Wall, D., "Systems for Late Code Modification," WRL Technical Note TN–19, Western Research Laboratory, Digital Equipment Corporation, Palo Alto, CA; Jun. 1991.

Wall, D., "Global Register Allocation at Link Time," WRL Research Repot 86/3, Western Research Laboratory, Digital Equipment Corporation, Palo Alto, CA; Oct. 28, 1986.

Wall, D., "Register Windows vs. Register Allocation," Proc. Sigplan '88 Conference on Programming Language Design and Implementation, Jun. 1988.

Wall, D., "Link–Time Code Modification," WRL Research Report 89/17, Western Research Laboratory, Digital Equipment Corporation, Palo Alto, CA; Sep. 1989.

Wolf, et al., "Portable Compiler Eases Problems of Software Migration," Computer Design, vol. 23, No. 13, (Littleton, MA), Nov. 1984, pp. 147–153.

Zelkowitz, et al., "Error Checking with Pointer Variables," Proceedings of the Association for Computing Machinery National Conference, pp. 391–395; 1976.

Austin, et al. "Efficient Detection of All Pointer and Array Access Errors," ACM Sigplan Notices, vol. 29, No. 6 (Jun. 1, 1994) pp. 290–301.

Cruess, M., "Memory management chip for 68020 translates addresses in less than a clock cycle," Electronic Design. vol. 34, No. 11 (May 1986), pp. 151–154, 156, 158, 160–161.

Wahbe, et al., "Practical Data Breakpoints: Design and Implementation," ACM Sigplan Notices, vol. 28, No. 6 (Jun. 1, 1993), pp. 1–12.

Wolf, et al., "Portable Compiler Eases Problems of Software Migration," Computer Design, vol. 23, No. 13 (Nov. 1984), pp. 147–153.

(List continued on next page.)

*Primary Examiner*—Tariq R. Hafiz
*Assistant Examiner*—Kakali Chaki
*Attorney, Agent, or Firm*—Steven A. Sernofsky

[57] ABSTRACT

A method and system for transforming and manipulating program object code. A set of program object code is transformed into a form in which it may be readily manipulated, preferably a form which is independent of both the processor and the operating system with which the object code will execute. The transformed object code is manipulated, preferably to add error-checking instructions, but possibly to add other functions or to alter the functions of the object code. The manipulated code is then reverse-transformed to program object code of the same type as the original object code.

17 Claims, 7 Drawing Sheets

OTHER PUBLICATIONS

Austin, et al., "Efficient Detection of All Pointer and Array Access Errors", Jun. 29, 1994, 8398 ACM Sigplan Notices, No. 6, pp. 290–301.

Cruess, Michael W., "Memory Management Chip For 68020 Translates Addresses In Less Than A Clock Cycle", May 15, 1986, 2328 Electronic Design, No. 11.

Wahbe, et al., "Practical Data Breakpoints: Design and Implementation", Jun. 29, 1993, 8398 ACM Sigplan Notices, No. 6, pp. 1–12.

"System V Application Binary Interface", UNIX Systems Lab. Inc. 1992 (pp. 4–1 to 4–33).

Ball, et al., "Optimally Profiling and Tracing Programs," Technical Report #1031, Revision 1, Computer Sciences Department, University of Wisconsin–Madison; Sep. 6, 1991.

Bartlett, J., "Compacting Garbage Collection with Ambiguous Roots," Western Research Laboratory, Ditigal Equipment Corporation, Palo Alto, CA; Technical Report; Feb. 1988.

Borg, et al., "Long Address Traces form RISC Machines: Generation and Analysis," WRL Research Report 89/14, Western Research Laboratory, Digital Equipment Corporation, Palo Alto, CA; Sep. 1989.

Charlton, et al., "A Microprogram Meta–Disassembler," Microprocessing and Microprogramming, vol. 22, No. 4, Oct. 1988, pp. 255–262.

Curry, T., "Profiling and Tracing Dynamic Library Usage Via Interposition," 1994 Summer USENIX Proceedings, Boston, MA, pp. 267–278, Jun. 6–10, 1994.

Feustel, E., "On the Advantages of Tagged Architecture," IEEE Transactions on Computers, vol. C–22, No. 7, pp. 644–656; Jul. 1973.

Goldberg, et al., "MTOOL: A Method for Detecting Memory Bottlenecks," WRL Technical Note TN–17, Western Research Laboratory, Digital Equipment Corporation, Palo Alto, CA; Dec. 1990.

Hastings, et al., "Purify: Fast Detection of Memory Leaks and Access Errors," USENIX Transactions, Winter 1992, pp. 125–136.

Huang, J.C., "Detection of Data Flow Anomaly Through Program Instrumentation," IEEE Transactions of Software Engineering, vol. SE–5, No. 3, pp. 226–236; May 1979.

Kaufer, et al., "Saber–C: An Interpreter–based Programming Environment for the C Language," 1988 Summer USENIX Proceedings, San Francisco, CA, pp. 161–171; Jun. 20–24, 1988.

Kempton, et al., "Run–time Detection of Undefined Variables Considered Essential," Software—Practice and Experience, vol. 20, No. 4, pp. 391–402, Apr. 1990.

Kessler, P., "Fast Breakpoints: Design and Implementation," Proceedings of the ACM Sigplan '90 Conference on Programming Language Design and Implementation, White Plains, NY, pp. 78–84; Jun. 20–22, 1990.

Larus, et al., "Rewriting Executable Files to Measure Program Behavior," Technical Report 1083, University of Wisconsin Computer Sciences Department; Mar. 25, 1992.

Merilatt, R., "C Dynamic Memory Use: Finding and exterminating C's dynamic memory errors," Dr. Dobb's Journal, pp. 62–67, 125; Aug. 1989.

Sato, et al., "Run–Time Checking in LISP by Integrating Memory Addressing and Range Checking," Research Development Corportation of Japan, Proc. Association for Computing Machinery, pp. 290–297; 1989.

Srivastava, et al., "A Practical System for Intermodule Code Optimization at Link–Time," WRL Research Report 92/6. Western Research Laboratory, Digital Equipment Corporation, Palo Alto, CA; Dec. 1992.

Steffan, J., "Adding Run–Time Checking to the Portable C Compiler," Software–Practice and Experience, vol. 22, No. 4, pp. 305–316; Apr. 1992.

Wall, D., "Regarding the Pure Software Patent," Western Research Laboratory, Digital Equipment Corporation, Palo Alto, CA; Dec. 21, 1993.

Wall, et al., "The Mahler Experience: Using an Intermediate Language as the Machine Description," Proc. 2nd Symposium on Architectural Support for Programming Languages and Operating Systems, Association for Computing Machinery, Inc.; 1987.

Wall, D., "Systems for Late Code Modification," WRL Research Report 92/3, Wester Research Laboratory, Digital Equipment Corporation, Palo Alto, CA; May 1992.

TRANSFORMING AND MANIPULATING PROGRAM OBJECT CODE

BACKGROUND OF THE INVENTION

1. Field of the Invention

This invention relates to transforming and manipulating program object code.

2. Description of Related Art

Most computer programs consist of source code, a set of instructions in a programming language which is relatively easy for human beings to read and understand. The source code is translated by a compiler into object code, a set of instructions suited for execution by a computer processor, and which is relatively difficult for human beings to read and understand. When developing or debugging a program, it is often desirable to be able to insert checkpoints or other extra functions into the program, so as to determine or verify the state of the program at known flow points.

One known method is to insert checkpoints into the source code and recompile the program, so as to generate object code which has the desired added functions. While this method achieves the purpose of adding known checkpoints at known flow points, it is subject to the drawback that recompilation of the source code can take substantial time and computing resources.

Another method is to insert checkpoints into the object code without recompiling the program. However, object code is strongly dependent on the platform (including machine architecture and operating system) for which the object code is designed. This has forced known methods to work using specific features of that platform when modifying the object code. This has the drawback that tools for inserting checkpoints into object code must be designed and built for specific platforms; this limits their utility and makes it difficult to port those tools to other platforms.

Accordingly, it would be advantageous to provide a method and system for manipulating object code which is generally applicable to object code designed for all platforms.

The following U.S. patent(s) and other documents may be pertinent:

U.S. Pat. No. 5,193,180, issued Mar. 9, 1993, in the name of Reed Hastings, titled "System for Modifying Relocatable Object Code Files to Monitor Accesses to Dynamically Allocated Memory";

U.S. Pat. No. 5,335,344, issued Aug. 2, 1994, in the name of Reed Hastings, titled "Method for Inserting New Machine Instructions Into Preexisting Machine Access to Memory";

Ball, Thomas, et al., "Optimally Profiling and Tracing Programs", University of Wisconsin Computer Sciences Technical Report 1031 (Sep. 6, 1991);

Bartlett, Joel F., "Compacting Garbage Collection with Ambiguous Roots", WRL Research Report 88/2 (Digital Western Research Laboratory, 1988);

Borg, Anita, et al., "Long Address Traces from RISC Machines: Generation and Analysis", WRL Research Report 89/14 (Digital Western Research Laboratory, September 1989);

Curry, Timothy W., "Profiling and Tracing Dynamic Library Usage Via Interposition", USENIX Conference Summer 1994 (Jun. 6–10, 1994);

Feustel, Edward A., "On The Advantages of Tagged Architecture", IEEE Transactions on Computers, vol. C-22, no. 7 (July 1973);

Goldberg, Aaron, et al., "MTOOL: A Method For Detecting Memory Bottlenecks", WRL Technical Note TN-17 (Digital Western Research Laboratory, December 1990);

Hastings, Reed, et al., "Purify: Fast Detection of Memory Leaks and Access Errors", USENIX Conference (Winter 1992);

Huang, J., "Detection of Data Flow Anomaly Through Program Instrumentation", IEEE Transactions on Software Engineering, vol. SE-5, no. 3 (May 1979);

Kaufer, Stephen, et al., "Saber-C: An Interpreter-based Programming Environment for the C Language", USENIX Conference (Summer 1988);

Kempton, Willett, et al., "Run-time Detection of Undefined Variables Considered Essential", Software - - - Practice and Experience, vol. 20(4), 391–402 (April 1990);

Kessler, Peter B., "Fast Breakpoints: Design and Implementation", Proceedings of the ACM SIGPLAN '90 Conference on Programming Language Design and Implementation (White Plains, New York, Jun. 20–22, 1990);

Larus, James R., et al., "Rewriting Executable Files to Measure Program Behavior", University of Wisconsin Computer Sciences Technical Report 1083 (March 25, 1992);

Randall, "C Dynamic Memory Use", Dr. Dobb's Journal (August 1989);

Sato, Mitsuhisa, et al., "Run-time Checking in Lisp by Integrating Memory Addressing and Range Checking";

Srivastava, Amitabh, et al., "A Practical System for Intermodule Code Optimization at Link-Time", WRL Research Report 92/6 (Digital Western Research Laboratory, December 1992);

Steffen, Joseph L., "Adding Run-time Checking to the Portable C Compiler", Software - - - Practice and Experience, vol. 22(4), 205–316 (April 1992);

Wall, David W., "Global Register Allocation at Link Time", WRL Research Report 86/3 (Digital Western Research Laboratory, Oct. 28, 1986);

Wall, David W., "Global Register Allocation at Link Time", Proceedings of the SIGPLAN '86 Symposium on Compiler Construction, SIGPLAN Notices 21, 7, pp. 264–275 (1986);

Wall, David W., "The Mahler Experience: Using an Intermediate Language as the Machine Description", WRL Research Report 87/1 (Digital Western Research Laboratory, 1987);

Wall, David W., "Register Windows vs. Register Allocation", Proceedings of the SIGPLAN '88 Conference on Programming Language Design and Implementation (June 1988);

Wall, David W., "Link-Time Code Modification", WRL Research Report 89/17 (Digital Western Research Laboratory, September 1989);

Wall, David W., "Systems for Late Code Modification", WRL Technical Note TN-19 (Digital Western Research Laboratory, June 1991);

Wall, David W., "Systems for Late Code Modification", WRL Research Report 92/3 (Digital Western Research Laboratory, May 1992); and Zelkowitz, Marvin V., et al., "Error Checking with Pointer Variables", Proceedings of the 1976 ACM National Conference (1976).

The pertinence of the related art will also be apparent to those skilled in the art after perusal of this application.

SUMMARY OF THE INVENTION

The invention provides a method and system for transforming and manipulating program object code. A set of program object code is transformed into a form in which it may be readily manipulated, preferably a form which is independent of both the processor hardware (processor independent) and the operating system with which the object code will execute (operating system independent). The transformed object code is manipulated, preferably to add calls to error-checking instructions, but possibly to add other functions or to alter the functions of the object code. The manipulated code is then reverse-transformed to program object code of the same type as the original object code.

In a preferred embodiment, the platform independent (processor independent and operating system independent) form of the object code comprises a linked list of pseudo-assembly code instructions, with each such instruction coupled to a set of symbol and relocation tags for that instruction. A platform independent assembly code manipulator is therefore able to insert instructions, delete instructions, rearrange instructions, and alter instructions, all without having to update the object code. After all manipulation of the platform independent assembly code is performed, a reassembler is able to produce a new set of object code responsive to the platform independent assembly code.

In a preferred embodiment, the platform independent assembly code manipulator inserts instructions for run-time checking the operation of the program, specifically to determine if the program attempts any inappropriate access to memory.

DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using one or more general purpose computers operating under program control, and that modification of a set of general purpose computers to implement the process steps and data structures described herein would not require undue invention.

TRANSFORMING AND MANIPULATING PROGRAM OBJECT CODE

Figure 1:
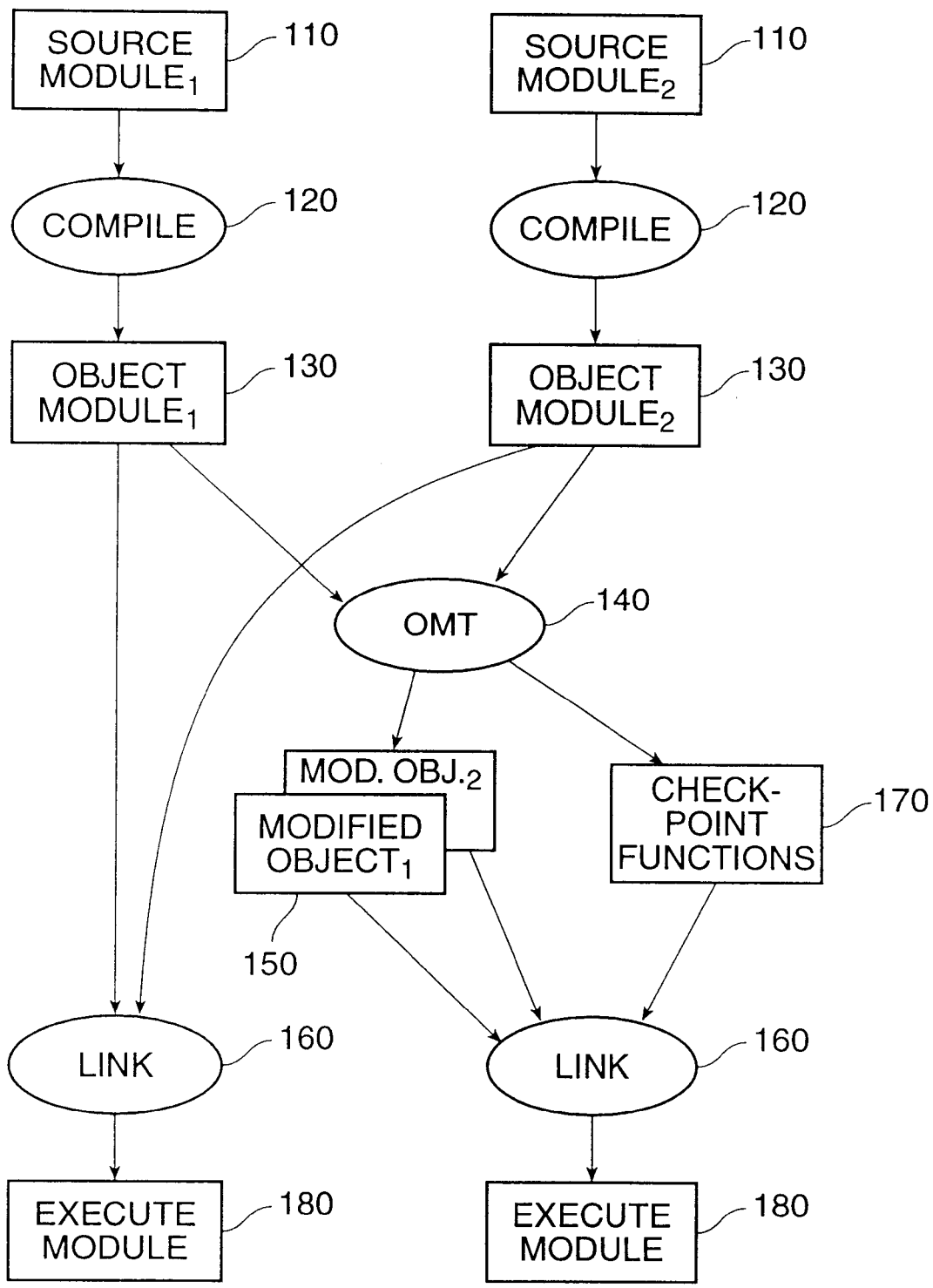
FIG. 1 shows a flow diagram of a method for transforming and manipulating program object code.

FIG. 1 shows a flow diagram of a method for transforming and manipulating program object code.

A method 100 for transforming and manipulating program object code comprises a sequence of steps to be performed by a computing system having a processor, the processor having program and data memory and mass storage, and likely having (although these components are not required) input devices such as a keyboard and pointing device and output devices such as a monitor, operating under control of operating system software for scheduling and executing application programs.

In a preferred embodiment, the computing system comprises a Sun Microsystems SPARCstation operating under the control of the SunOS 4.1.x operating system. However, in alternative embodiments, the computing system may comprise one of the combinations of processor hardware and operating system software shown in table 1-1.

TABLE 1-1

| Processor Hardware | Operating System Software |
| --- | --- |
| Data General AViiON | DG-UX 5.4.3 |
| DEC Alpha AXP 3.2 | DEC UNIX (OSF/1) 3.0 or 3.2 |
| DEC DECstation | ULTRIX 4.2 or 4.3 |
| Hp 9000/7xx | HP/UX 9.x |
| HP 9000/8xx | HP/UX 8.x or 9.x |
| IBM RS6000 | AIX 3.2.x or 4.1 |
| Intel 80x86 | SCO UNIX/ODT 2.0 or 3.0, Solaris/X86 2.4, NCR SVR4.0 (MP/RAS), UnixWare 1.1 (SVR4.2), or UnixWare 2.0 (SVR4.2MP) |
| Silicon Graphics (SGI) | IRIX 5.2 or 5.3 |
| Sun SPARCstation | Solaris 2.x |

Those skilled in art will recognize, after perusal of this application, that the invention may be applied to and implemented for other processor hardware and operating system software, some of which may not yet exist today, without undue experimentation, and that such application and implementation would be within the scope and spirit of the invention.

At a start point for the method 100, a user desires to compile a source module (that is, a computer program written in a source code language), so as to produce an object module (that is, the same computer program translated into object code), and to link that object module, so as to execute that program.

A first source module 110 is coupled to a compiler 120, which reads the first source module 110 and translates it into a first object module 130. Similarly, a second source module 110 is also coupled to a compiler 120, which reads the second source module 110 and translates it into a second object module 130.

Although in a preferred embodiment, the first source module 110 and the second source module 110 are both written in the same source code language, preferably the C or C++ programming languages or variants thereof, and the first compiler 120 and the second compiler 120 are the same compiler, there is no specific requirement for operation of the invention that this is the case.

Thereafter, the first and the second object modules 110 are coupled to an object module transformation (OMT) program 140, which reads the first object module 130 and produces in response thereto a first modified object module 150. Similarly, the OMT program 140 reads the second object module 130 and produces in response thereto a second modified object module 150.

The OMT program 140 couples the first and second modified object programs 150 to a linker program 160, along with a set of supplemental library code 170. The linker program 160 links the first and second modified object programs 150, along with the supplemental library code 170, to produce an executable program 180.

The executable program 180 may be executed on the processor and under control of the operating system software to perform the tasks set for the original program, but using any enhancements or other modifications introduced by the OMT program 140. In a preferred embodiment, the enhancements or other modifications introduced by the OMT program 140 comprise calls to checkpoint functions, which are added to the program to detect and report errors, such as memory access errors.

As used herein, "checkpoint" means instructions inserted into the program; "checkpoint function" means a function which performs an error-checking or similar function. A checkpoint generally calls a checkpoint function to perform the actual error-checking or other function.

However, those skilled in the art will recognize, after perusal of this application, that the OMT program may introduce other and further modifications to the original program without undue experimentation, and that such other and further modifications would be within the scope and spirit of the invention.

Examples of such other and further modifications include those shown in table 1-2.

TABLE 1-2 instructions for profiling an object module, such as (a) determining which instructions or sets of instructions of the object module are executed, (b) determining which data elements or structures are read or written by the object module, or (c) determining how much processing time is taken by which instructions or modules of the object module;

instructions for using functions which are available when executing the object module using a different processor or different operating system software, such as (a) emulating a different processor, (b) using a floating point unit available with a different processor, or (c) using a different application program interface for a different operating system; or instructions for emulating alternative processor behavior, such as emulating a hardware floating point unit in software when the floating point unit is erroneously constructed, such as for some Intel Pentium processors.

Figure 2:
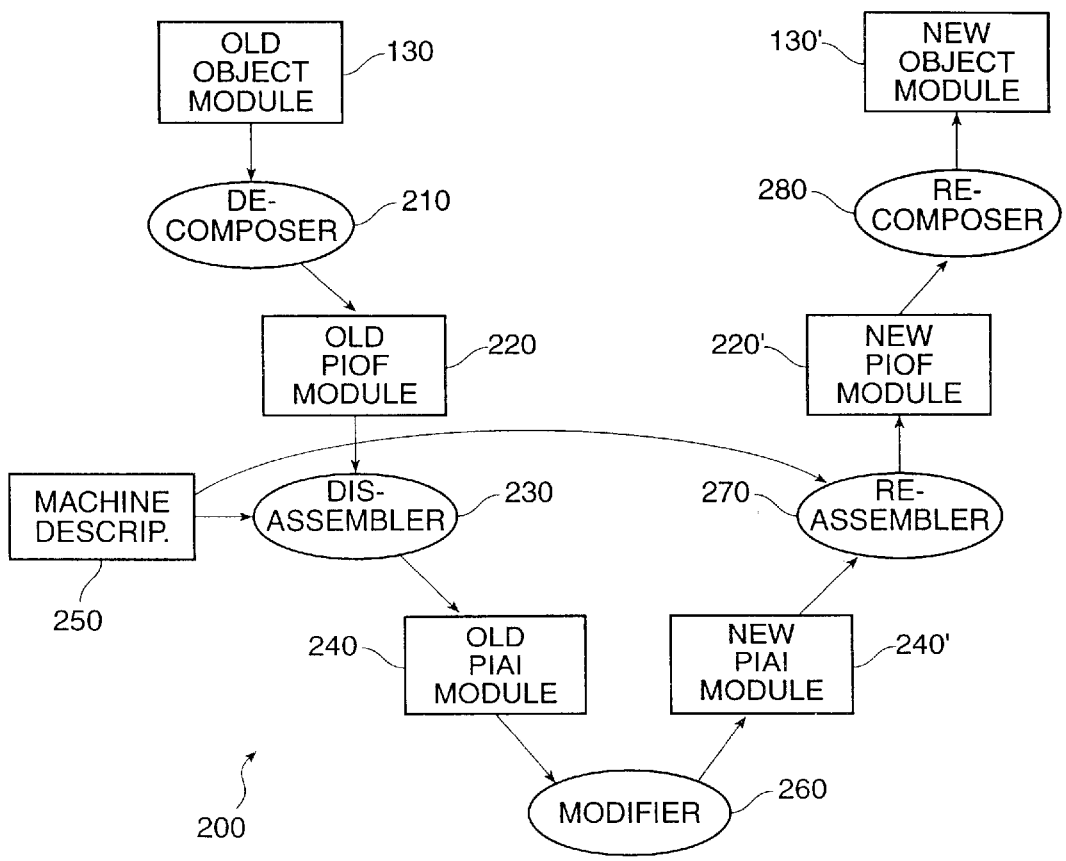
FIG. 2 shows a flow diagram of the method for operation of an object module transformation program.

FIG. 2 shows a flow diagram of the method for operation of an object module transformation program.

A method 200 for operation of the OMT program 140 comprises a start point at which the OMT program 140 is coupled to the object module 130.

A decomposer 210 reads the object module 130 and decomposes it from its original format as produced by the compiler 120 to a platform-independent object format (PIOF) module 220, corresponding to the original object module 130.

As used herein, "processor independent" means not relying on specific features of the computing hardware upon which a program is to be executed; "operating system independent" means not relying on specific features of the operating system software under control of which a program is to be executed; "platform independent" both processor independent and operating system independent.

A disassembler 230 reads the PIOF module 220 and disassembles it into a set of platform-independent assembly instructions (PIAI), herein referred to as a PIAI module 240, again corresponding to the original object module 130. In a preferred embodiment, the disassembler 230 is built in part by compiling a machine description 250, which describes the format and nature of machine instructions for the particular processor for which the object module 130 was compiled.

A modifier 260 reads the PIAI module 240 and modifies it to produce a new PIAI module 240'. The new PIAI module 240' has additional or altered functions which were not present in the original PIAI module 240 or in the original object module 130.

A reassembler 270 reads the new PIAI module 240' and assembles the platform-independent assembly instructions into machine instructions in the platform-independent object format, to produce a new PIOF module 220', corresponding to the new PIAI module 240'. Like the new PIAI module 240', the new PIOF module 220' has additional or altered functions which were not present in the original PIAI module 240 or in the original object module 130. In a preferred embodiment, the reassembler 270 is also built in part by compiling the machine description 250.

A recomposer 280 reads the new PIOF module 220' and recomposes it into the original format as produced by the compiler 120, to produce a modified object module 130', again corresponding to the new PIAI module 240'. The modified object module 130' thus has additional or altered functions which were not present in the original object module 130, but is properly formatted for execution using the same platform as the original object module 130.

PLATFORM-INDEPENDENT OBJECT FORMAT

Figure 3:
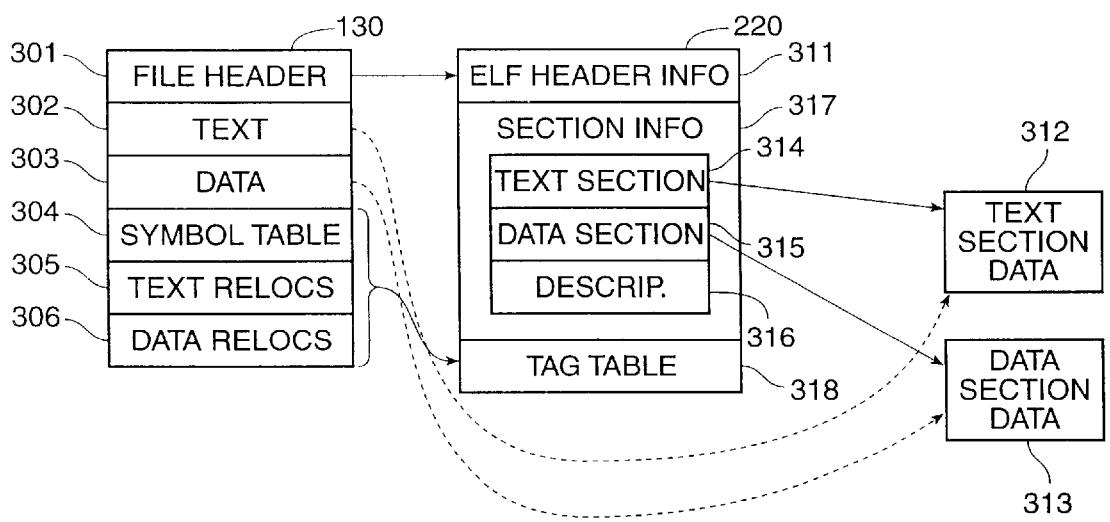
FIG. 3 shows a diagram for translating a specific object code format to a platform-independent object format.

FIG. 3 shows a diagram for translating a specific object code format to a platform-independent object format.

The object module 130 generally comprises a specific object code format, such as for example an object code format having a file header 301 for describing the object module 130, a text section 302 for instructions to be executed, a data section 303 for data for those instructions, a symbol table 304 for information about symbols used in the object module 130, a set of text relocations 305 for recording information about relocating instructions, and a set of data relocations 306 for recording information about relocating data.

The decomposer 210 examines the original object module 130 and locates each one of those sections therein. Where the original object module 130 comprises another different organization, the decomposer 210 is programmed to recognize that different organization and identify debugging tables or other information, line number tables or other information, relocation tables or other information, symbol tables or other information, and any shared library formats and related information. The decomposer 210 then constructs the PIOF module 220 therefrom, using information found in those sections.

The PIOF module 220 comprises an ELF header 311 comprising information like the ELF header format for the SunOS operating system. A 32-bit version of the ELF header format is described in "UNIX System V Application Binary Interface", hereby incorporated by reference as if fully set forth herein; a 64-bit version of the ELF header format is described by documentation for the DEC Alpha/OSF platform, hereby incorporated by reference as if fully set forth herein. Information from the file header 301 is copied over to the ELF header 311.

The PIOF module 220 comprises text section data 312, comprising the instructions to be executed from the text section 302, and data section data 313, comprising the data from the data section 303. A text section pointer 314 to the text section data 312, a data section pointer 315 to the data section data 313, and section description information about the text and data 316, are bundled into a section descriptor 317. Each section descriptor 317 comprises an ELF section header.

The PIOF module 220 comprises a tag table 318, comprising information from the symbol table 304, the text relocations 305, and the data relocations 306. Each entry in the symbol table 304, any relocation table, and if they are defined for the object module 130, any line number table or debug information table, are considered tags and are entered into the tag table 318.

The tag table 318 comprises a tag address and a tag type value for each tag. The tag value may indicate that the tag is a symbol (tag type 1), a relocation which does not have an addend (tag type 2), a relocation which does have an addend (tag type 3), a line number entry (tag type 4), a debug information entry (tag type 5), or an unknown tag type (tag type 0). The tag address points to a structure which describes the tag and whose meaning depends on the tag type. However, at least the location and size of the tag are maintained for all types of tags.

PLATFORM-INDEPENDENT ASSEMBLY CODE

Figure 4:
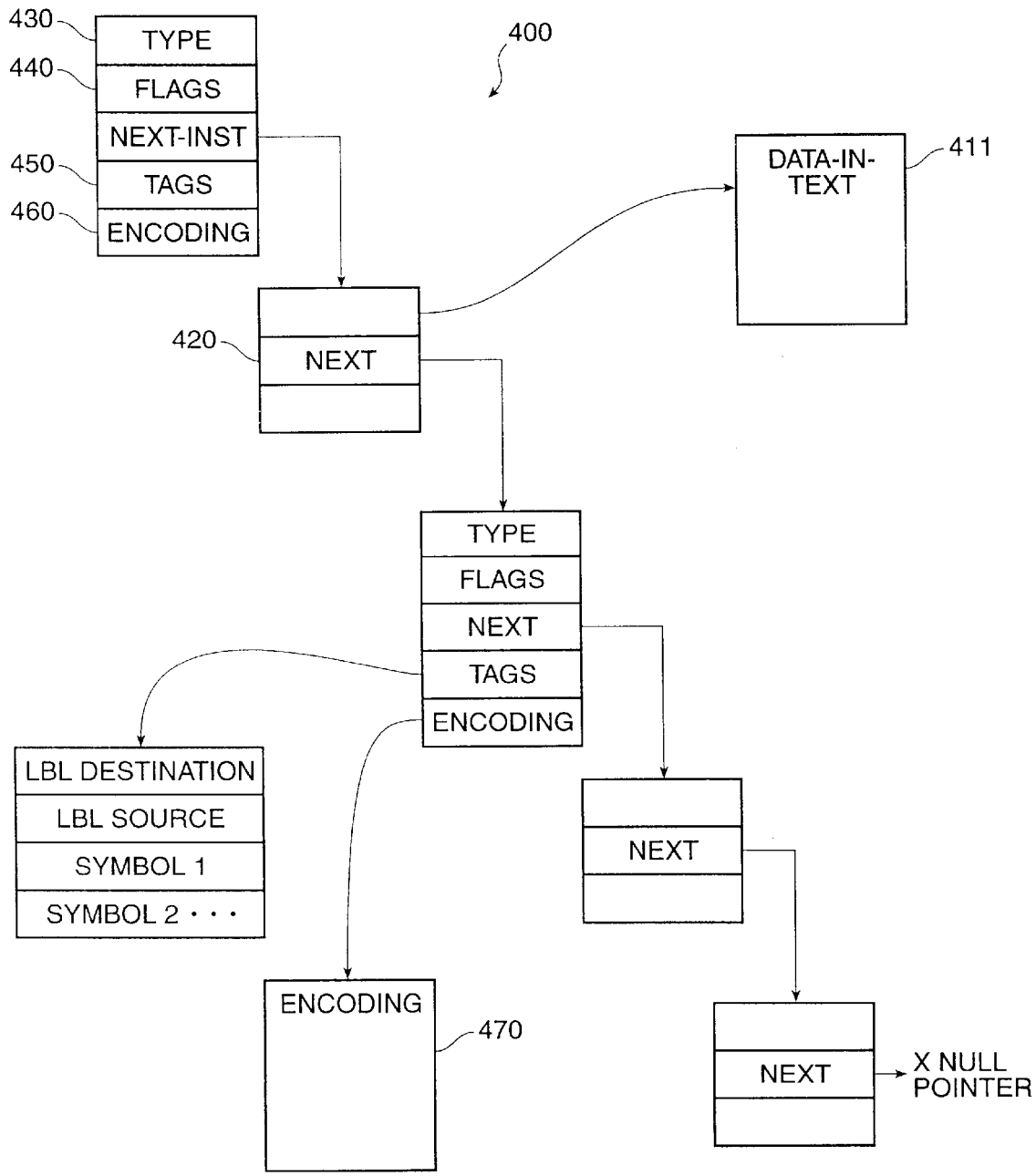
FIG. 4 shows a block diagram of a data structure for platform-independent assembly code.

FIG. 4 shows a block diagram of a data structure for platform-independent assembly code.

The PIAI module 240 comprises a linked list 400 of individual assembly code instructions, each of which is described independent of the processor and the operating system on which the object module 130 is intended to operate. The linked list 400 comprises a sequence of instructions 410.

Each instruction 410 comprises additional information besides the actual instruction itself, including information about the nature of the instruction 410 (for use by the modifier 260), pointers to tags used in the instruction, and optionally a preferred object module implementation of the instruction. In a preferred embodiment, each instruction 410 plus its additional information comprises about fifty bytes of information.

Each instruction 410 may comprise an assembly instruction, or may alternatively comprise a placeholder block for a sequence of data-in-text 411. The data-in-text 411 may comprise a block of text which has yet to be disassembled into instructions 410, or may comprise a block of data which appears in-line with instructions 410.

Each instruction 410 comprises a next-instruction pointer 420, which points to the next instruction 410 in the linked list 400. The next-instruction pointer 420 is null for the last instruction 410 in the linked list 400.

Each instruction 410 comprises a type field 430, which specifies the type of operation which the instruction performs, and thus generally corresponds to an operation code. The type of operation is sufficiently specific so that that reassembler 270 can determine which machine instructions to assemble the instruction 410 into when constructing the modified PIOF module 220'.

For example, the type field 430 could specify that the instruction 410 is an 3-argument ADD instruction, and thus that the effect of the instruction is to add two of its arguments together and put the results in the third argument. Alternatively, the type field 430 could specify that the instruction is a 2-argument LOAD instruction, and thus that the effect of the instruction is to load a register (its first argument) with the contents of a memory location (its second argument). Numerous instruction types are known to those skilled in the art.

Each instruction 410 comprises a flags field 440, which specifies aspects of the instruction 410 which the modifier 260 will need to know. Some flags used in a preferred embodiment are shown in table 4-1.

Table 4-1 whether the instruction reads from a memory location;
whether the instruction writes to a memory location;
whether the instruction uses any processor condition codes, and if so, which ones;
whether the instruction alters any processor condition codes, and if so, which ones;
whether the instruction transfers control to another program location (other than the very next location);
whether the instruction is a conditional instruction, such as a conditional branch instruction;
(for RISC processors) whether the instruction has a delay slot following it.

Each instruction 410 comprises a tags pointer 450, which points to a set of tags in the tag table 318 which are used by that instruction 410.

Each instruction 410 comprises an encoding pointer 460, which points to a specific encoding 470 for that instruction 410. If there is no specific encoding 470 for that instruction 410 yet, the encoding pointer 460 will be null or will point to a null specific encoding 470.

The machine description 250 provides the information for the disassembler 230 to construct the PIAI module 240 from the PIOF module 220. The machine description 250 comprises a machine description language, which is written to describe the nature of the particular processor, which is compiled into a processor-dependent part of the disassembler 230, and which is combined with a processor-independent part of the dissember 230 to construct the disassembler 230. The disassembler 230 need only be constructed once for any particular processor.

In a preferred embodiment, the machine description language is preprocessed using a C or C++language preprocessor, and comprises (1) a header, (2) a register set description, (3) a list of individual register descriptions, (4) an instruction set branch characteristics description, (5) an instruction set formatting description, and (6) an instruction set properties description. The machine description may define and use local variables, as permitted by the C language preprocessor.

(1) The machine description header specifies the byte order ("big-endian" or "little-endian") for the machine, the bit order (whether bit 0 is the most or least significant bit), and an initial word size for the machine.

(2) The register set description specifies a set of register group specifications, each of which specifies a name for the register group and the number of registers in that group.

(3) Each individual register description specifies a (possibly null) list of aliases for that register and a set of register flags. Some register flags include whether the register can be used as a temporary register, whether the register is a special register such as the program counter or the stack pointer or a null register, whether the register is writable, and other information about registers which is of use to the disassembler 230, the modifier 260, or the reassembler 270.

(4) The instruction set branch characteristics description comprises a list of offset-operand definitions and a branch table.

The list of offset-operand definitions specifies, for each instruction, an instruction name and a list of operand tuples. Each operand tuple defines, for each operand for the instruction, an operation size in bytes, an offset type, and a number of significant bits of offset range.

The branch table comprises a list of branch tuples; each branch tuple specifies the name of a branch instruction, its complement branch instruction (if it is a conditional branch), and the offset list which defines how to construct that branch instruction.

(5) The instruction set formatting description comprises a list of format specifications, each including a name, a width in bits, and a list of fields filling the format. Each field description itself comprises a name, a range of bits that make up the field in the instruction, and information on how to find the raw data for that field within the instruction and how to store data into that field.

(6) The instruction set properties description comprises a set of switch descriptions specifying which fields of the instruction must be set to which values to recognize particular instructions. The disassembler 230 uses these switch descriptions to generate individual instructions 410, to specify their operands, and to set flags indicating the nature of those instructions 410. These flags are used by the modifier 260 in determining how to modify the PIAI module 220.

Figure 5:
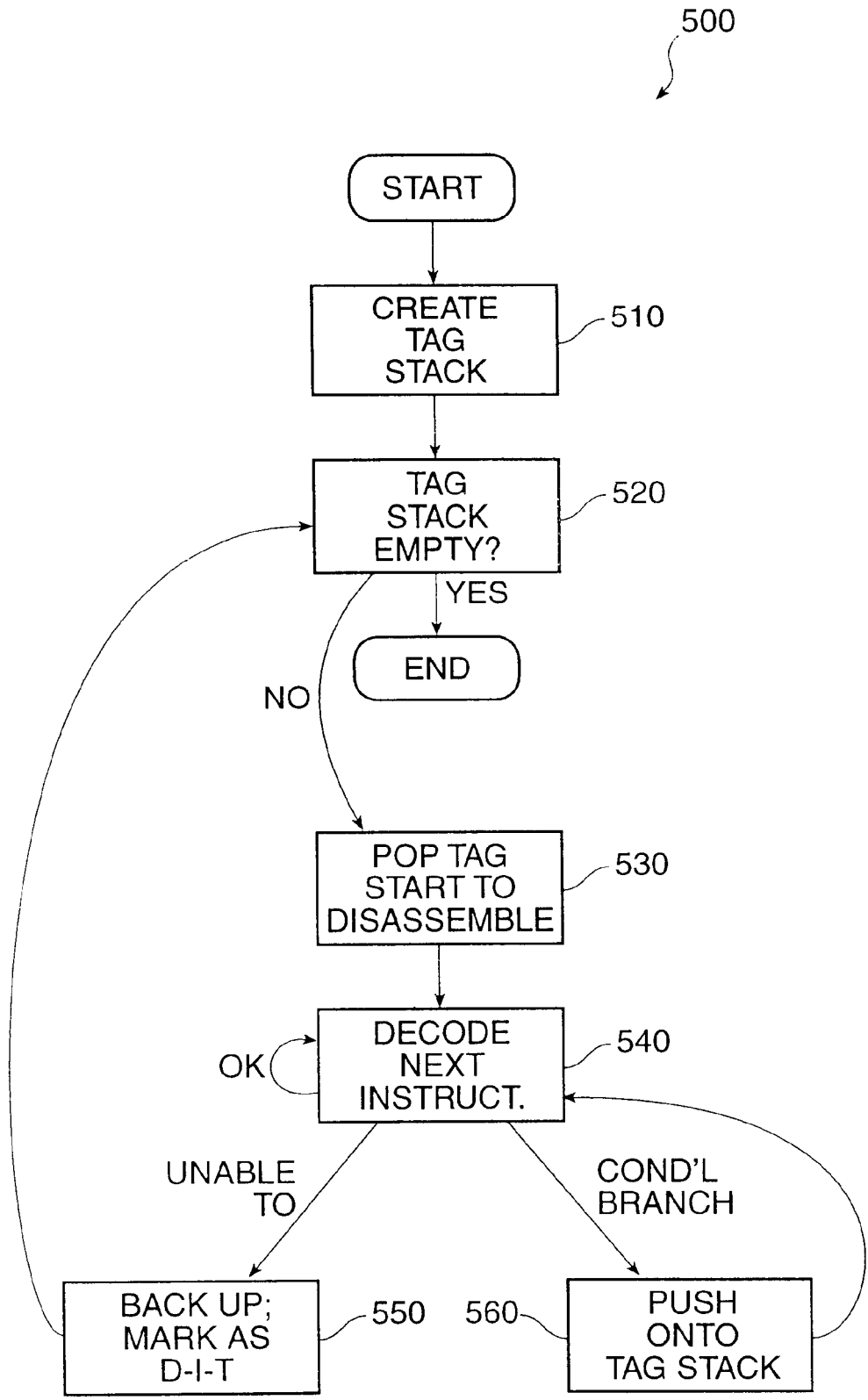
FIG. 5 shows a flow diagram of a method for operation of the disassembler.

FIG. 5 shows a flow diagram of a method for operation of the disassembler 230.

A method 500 for operation of the disassembler 230 operates to translate all text into instructions 410, or into placeholder blocks which represent data-in-text 411. At a start point, the disassembler 230 receives text section data 312 to be disassembled.

By this method 500, the disassembler 230 traces all possible paths by which control might be transferred to any instruction 410, and disassembles each such instruction 410. All text words at locations which cannot be reached for execution are marked as data-in-text 411.

The method 500 also operates in conjunction with hint information (not shown), which comprises information for the disassembler 230 regarding the location of the various code issues described herein, such as (1) the location of data in text, (2) the location of jump tables, and (3) whether to use global data memory barriers, (4) the begin and end locations of functions in system libraries. The hint information also comprises information and parameters, such as what types of errors to checkpoint and which functions in the module to checkpoint. The hint information thus provides a mechanism for assisting the disassembler 230 with handling particular pathological cases which have been noticed in the past. Hint information is also provided for other parts of the OMT program 140, including the modifier 260 and the reassembler 270.

At a step 510, the disassembler 230 creates a tag stack (not shown) and pushes all tags which might point to instructions 410 for execution onto the tag stack.

In performing the step 510, the disassembler 230 attempts to recognize the use of jump tables by the PIAI module 240. A jump table comprises a set of jump instructions or target addresses for a set of target labels, plus a header for determining which one of that set of jump instructions or target ad- dresses will be invoked to jump to a target label. The disassembler 230 recognizes jump tables so that it can identify target labels for those jump tables, and so that the recomposer 280 can later relocate those jump tables.

The disassembler 230 looks for a set of relocations which have the pattern of a jump table, such as a set of relocations all at nearly the same location and all specifying relocation by the same amount, or a particular sequence of instructions known to be found in a jump table or a jump table header. The particular sequence of instructions which specifies a jump table or jump table header is generally specific to the compiler used to compile the source module 110. Hence, it is typically necessary to update the disassembler 230 with changes to commonly used compilers.

Because optimizing compilers tend to insert instructions in between otherwise closely related instructions, it is necessary when searching for these patterns to allow a certain degree of fuzziness. For example, if a particular sequence of instructions is four instructions long, the disassembler 230 would attempt to recognize two of those within ten instructions 410, or three of those within 25 instructions 410. Moreover, the allowed degree of fuzziness is configurable and adaptive to what has been found so far, so that for example, if some of a jump table header has been found, the disassembler 230 will make an extra effort to find the rest of it somewhere in the PIAI module 220.

At a step 520, the disassembler 230 determines if the tag stack is empty. If so, the method 500 is done. If not, the disassembler 230 proceeds to the step 530.

At a step 530, the disassembler 230 pops a tag off the tag stack and begins disassembly at the location indicated by that tag.

At a step 540, the disassembler 230 disassembles the next sequential text word into an instruction 410. If the disassembler 230 is successful in doing so, it repeats this step 540. If the disassembler 230 encounters a text word which it cannot disassemble into an instruction 410, it proceeds with the step 550. If the disassembler 230 encounters a conditional branch instruction 410, it proceeds with the step 560.

At a step 550, the disassembler 230 backs up to the most recent tag from which it disassembled text into instructions 410, and constructs a placeholder block indicating that all those text words are data-in-text 411. The disassembler 230 then proceeds with the step 520.

At a step 560, the disassembler 230 pushes the location referenced by the conditional branch instruction onto the tag stack, and proceeds with the step 540.

MODIFYING THE ASSEMBLY CODE

Figure 6:
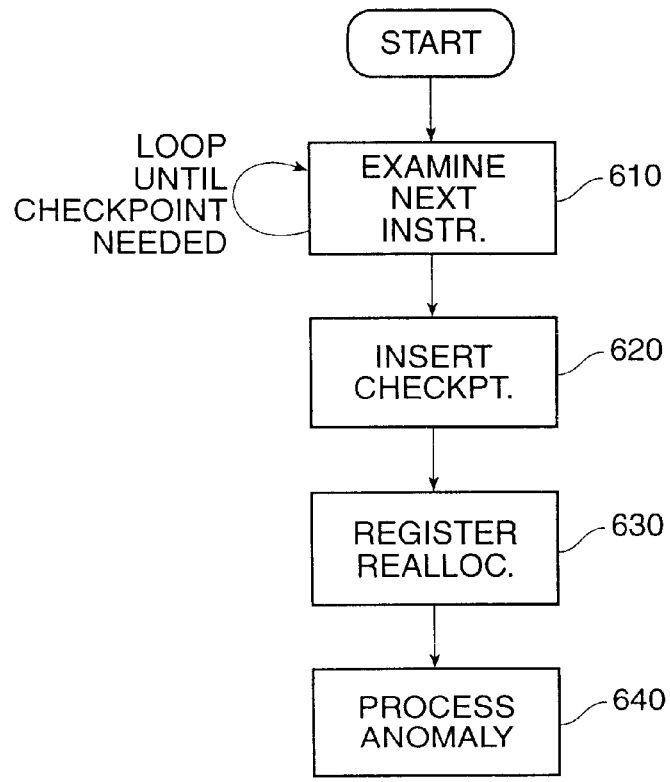
FIG. 6 shows a flow diagram of a method for modifying the PIAI module.

FIG. 6 shows a flow diagram of a method for modifying the PIAI module.

In a preferred embodiment, a method 600 for modifying the PIAI module 240 operates to insert a call to an error-checking checkpoint function before each instruction 410 which might cause an error. In a preferred embodiment, memory access errors are checked for.

By this method 600, the modifier 260 inserts a call to a checkpoint function before each instruction 410 in the PIAI module 240 which reads from or writes to memory, and further modifies the PIAI module 240 so as to assure that, except for error-checking, the operation of the modified PIAI module 240' is identical to the unmodified PIAI module 240. However, if the checkpoint for a first instruction 410 assures there can be no memory access error for a second instruction 410, a second checkpoint is not necessary.

At a start point for the method 600, the modifier 260 receives the PIAI module 240.

At a step 610, the modifier 260 examines a next instruction 410 to determine if a call to a checkpoint function must be inserted for that instruction 410. If not, the modifier 260 repeats this step 610 until it finds such an instruction 410.

At a step 620, the modifier 260 inserts a checkpoint before the instruction 410. The nature of the checkpoint depends on the nature of the instruction 410. For example, if the instruction 410 reads from a location in memory, the checkpoint to be inserted is a call to a checkpoint function which determines whether reading from that location in memory would be a memory access error. Because the instructions 410 are organized in a linked list 400, the modifier 260 can easily insert the checkpoint by altering the next-instruction pointers 420 as to insert the checkpoint into the linked list 400.

In performing the step 620, the modifier 260 attempts to recognize the use of global memory by the PIAI module 240. It is common for programs to access tables in memory with reference to a base address for the table and an offset from that base address. When a reference using a table and offset is found, the modifier 260 attempts to place the table in a in a section of memory bounded by "memory barriers". Memory barriers are areas of memory for which the object module 130 does not have any access. The modifier 260 also inserts a call to a checkpoint function, so that if the object module 130 attempts to use an offset which points outside the table, the checkpoint function detects and reports the error.

However, some compilers collect several such tables together into a single section of memory, and use an offset from a base address for that single section of memory. The modifier 260 looks for a negative offset used from a base address; if one is found, the modifier 260 presumes that the compiler has gathered more than one table into a single section of memory, and does not separate the tables by memory barriers.

In performing the step 620, the modifier 260 attempts to recognize memory initialization by the PIAI module 240. Access to each memory location is specified as one of four possible values: (00) no access at all, (01) read only, (10) write only, and (11) both read and write access. Memory space which is unallocated is assigned value 00, no access.

These access restrictions are imposed by the OMT program 140, not by the operating system. For example, memory barriers are flagged to have no access at all, even though the object module would be given access by the operating system to that memory, so that any attempt to read from or write to those regions of memory will be recognized as an error.

When uninitialized memory space is allocated for theprogram, it is assigned value 10, write only, until the first write operation into that memory. When the program writes into a memory location and write access is permitted for that memory location, that memory location is also assigned read access if it did not already have read access. Thus, read access is denied until the program stores an initialization value into the memory location. When memory is allocated in a pre-initialized state, it is assigned value 11, both read and write access, at that time. Some regions of memory, such as the text of instructions and constant values which are needed for computation, are assigned value 01, read only, when first allocated.

In performing the step 620, the modifier 260 attempts to recognize program code for structure copying used by the PIAI module 240. When the source code specifies copying a large structure, compilers often generate a series of instructions designed to implement a move of the entire section of memory in which the source structure is stored to the entire section of memory in which the target structure is stored. However, the structure might contain "holes", memory locations within the structure which were skipped to align structure elements at known offsets or known offset multiples (such as alignment at a double-word boundary or a page boundary). Otherwise, copying data from a hole in the source structure to a hole in the target structure would cause an error due to the read from an uninitialized location.

The modifier 260 looks for a loop generated by the compiler for copying a block of memory locations from the source structure to the target structure. When a copying loop is recognized, a call to a checkpoint function is used which checks both the source memory location and the target memory location; no error is generated if the copying loop contains a copy operation from an uninitialized location to an unlabeled location (unless of course the user has requested reports of such errors).

In performing the step 620, the modifier 260 attempts to optimize the checkpoint functions for speed. One of the slowest aspects of calling a function is the overhead associated with creating a stack frame and saving registers and other program state. It is expected that almost all calls to checkpoint functions will return without detecting an error. Accordingly, the checkpoint functions are written to first check for an error, and if no error is present, to return immediately without incurring the overhead of a true function call. If, and only if, an error is detected, a true function call is made, to a more general checkpoint function which determines the type of error and reports the error.

At a step 630, the modifier 260 determines if registers must be reallocated for use in the instruction 410.

In a preferred embodiment, the modifier 260 reserves several registers for checkpoint functions. In the Sun SPARCstation, these registers include % g4, which is used to point to the process linking table 900 (see FIG. 9), % o7, which records the return address for a subroutine call, and % g2, % g3, % l2, and other registers.

If the PIAI module 220 uses any of the registers which the modifier 260 reserves for checkpoint functions, the modifier 260 adds code to store the "user" value of that register in the register spilling pool 913 (see FIG. 9), and will load such value into a substitute register, which is used in the original instruction.

For example, the modifier 260 will alter the instruction shown in table 6-1 to the sequence shown in table 6-2.

TABLE 6-1

| add %r3,%r3,[%g4] | ; add r3 + g4 and store in r3 |

TABLE 6-2

| st %l2,[%g4-l2_offset] | ; save %l2 in spill area |
| ld %l2,[%g4-g4_offset] | ; get %g4 value and put in %l2 |
| add %r3,%r3,%l2 | ; modified user instruction |
| ld %l2,[%g4-l2_offset] | ; get %l2 value from spill area |

This insures that the places where % g4 is used in the original code will still execute the same logical operation, while not using the % g4 register.

The procedure for subroutine calls and returns is more complex. When the PIAI module 220 uses register % o7 for an arithmetic calculation, the modifier 260 must save a copy of the correct value for % o7 in the register spilling pool 913 just prior to each checkpoint function call. The checkpoint functions are designed to always restore the saved register % o7 from the register spilling pool 913 as part of the checkpoint function exit.

In addition, there are some simple procedures which have no formal stack frame (in order to save the overhead that this entails). These procedures are commonly referred to as "leaf" procedures since they cannot call other functions. When the PIAI module 220 recognizes such a procedure, it must also save register % o7 to the register spilling pool prior to each checkpoint function call. This is necessary because the leaf procedure depends upon the value of register % o7 to return to the place where it was called from.

At a step 640, the modifier 260 determines if inserting the checkpoint before the instruction 410 would cause an anomaly, possibly due to (a) an instruction with a delay slot just before the instruction 410 to be checkpointed, (b) a label pointing to the instruction 410, or (c) alteration or use of the processor condition codes near the instruction 410. Whatever changes the modifier 260 makes to the PIAI module 220 must preserve the behavior of the processor expected by the compiler when it generated the object module 130.

Insertion of a call to a checkpoint function into a delay slot will change that behavior when the delay slot is executed in conjunction with a branch instruction 410, because the instruction which should be in the delay slot is pushed out by the checkpoint. The modifier 260 replaces the branch instruction 410 with a new sequence of instructions 410, so that both the instruction 410 and its checkpoint function are executed when the branch is taken, but no further instructions 410, and so that the instruction 410, its checkpoint function, and further instructions 410 in sequence are executed when the branch is not taken.

Often this can be achieved by placing the call to the checkpoint function before the branch instruction 410. The code fragments shown in table 6-3 and table 6-4 are illustrative.

Table 6-3 shows the original PIAI module 220.

TABLE 6-3

| B | [r4] | ; branch | 01 |
| LOAD | r3, [r5] | ; instruction to checkpoint | 02 |

Table 6-4 shows the rearranged PIAI module 220. The instruction 410 and its checkpoint are always executed, and the conditional branch conditionally transfers control to the target label.

TABLE 6-4

| .checkpoint | | ; checkpoint routine | 03 |
| LOAD | r3, [r5] | ; instruction to checkpoint | 04 |
| B | [r4] | ; branch | 05 |
| NOP | | ; delay slot | 06 |

However, if the branch is a conditional branch, is the target of a label, or must itself be checkpointed, or if the instruction in the delay slot is the target of a label, this will be unsatisfactory.

Table 6-5 shows the original PIAI module 220, with a conditional branch.

TABLE 6-5

| BGT | [r4] | ; conditional branch | 07 |
| LOAD | r3, [r5] | ; instruction to checkpoint | 08 |

A better solution, for these cases, is to duplicate both the instruction 410 and its checkpoint function, so as to construct two separate paths for executing them, and to replace the branch instruction 410 with its complement branch instruction 410 (the complement branch would be taken in all cases when the original branch would not be taken, and would not be taken in all cases when the original branch would be taken). The code fragment shown in table 6-6 is illustrative:

Table 6-6 shows that if the original branch would not have been taken, the instruction 410 and its checkpoint are executed (at label ".local.1"), and the PIAI module 220 continues in sequence. However, if the original branch would have been taken, the instruction 410 and its checkpoint are executed (at lines 11–12), and an unconditional branch is taken to the target of the original branch instruction 410.

TABLE 6-6

| | BLE | .local.1 | ; complement of branch | 09 |
| | NOP | | ; delay slot | 10 |
| | .checkpoint | | ; checkpoint routine | 11 |
| | LOAD | r3, [r5] | ; instruction to checkpoint | 12 |
| | B | [r4] | ; branch always to target | 13 |
| | NOP | | ; delay slot | 14 |
| .local.1 | .checkpoint | | ; checkpoint routine | 15 |
| | LOAD | r3, [r5] | ; instruction to checkpoint | 16 |

This code could of course be optimized to make better use of delay slots.

The code shown in table 6-6 would work in all cases, but is substantially slower than the code in table 6-4. Accordingly, the modifier 260 seeks to use the simplest code which will provide identical function. However, in any circumstance where it is unclear where code will provide identical function, the code shown in table 6-5 should be used.

Insertion of a call to a checkpoint function just before a label might change that behavior depending on whether the labeled instruction 410 is reached by a branch instruction 410 or not. In this case, the modifier 260 adjusts the label to reference the beginning of the checkpoint function.

Insertion of a call to a checkpoint function might change that behavior because the checkpoint function might alter the condition codes. Accordingly, before inserting a checkpoint function, the modifier 260 examines the PIAI module 220 to determine whether any instructions 410 before the instruction 410 to be checkpointed set the condition code and whether any instructions 410 after the instruction 410 to be checkpointed use the condition codes. If so, the modifier 260 uses a version of the checkpoint function which saves and restores the condition codes. Because saving and restoring the condition codes is quite time-consuming for some processors, the modifier 260, whenever possible, uses a version of the checkpoint function which does not save or restore the condition codes.

RECOMPOSITION AND LINK MODIFICATION

Figure 7A:
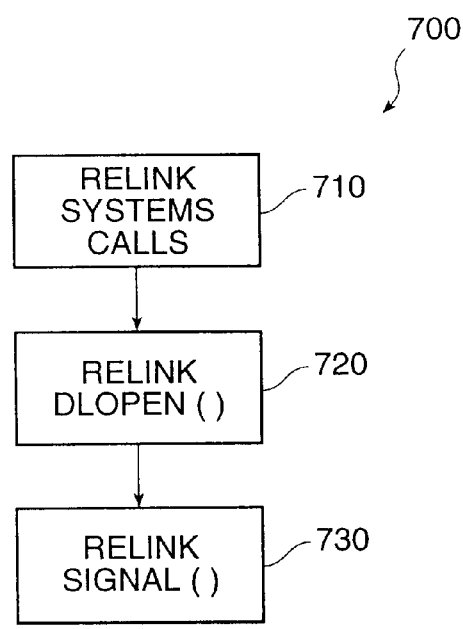
FIG. 7A shows a flow diagram of a method for operation of the recomposer.
Figure 7B:
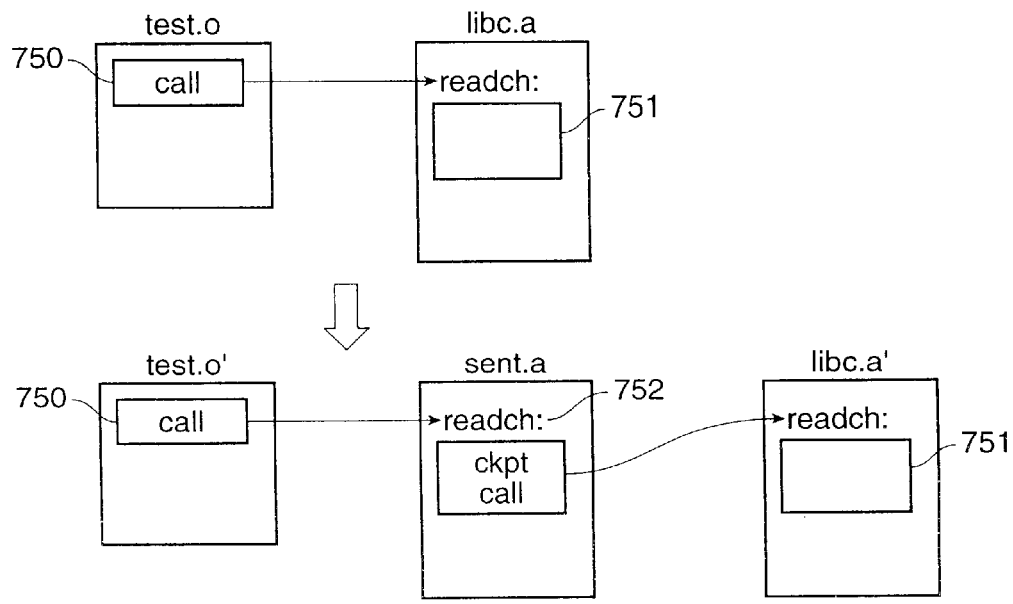
FIG. 7B and FIG. 7C show program structures for use with the method of FIG. 7A.
Figure 7C:
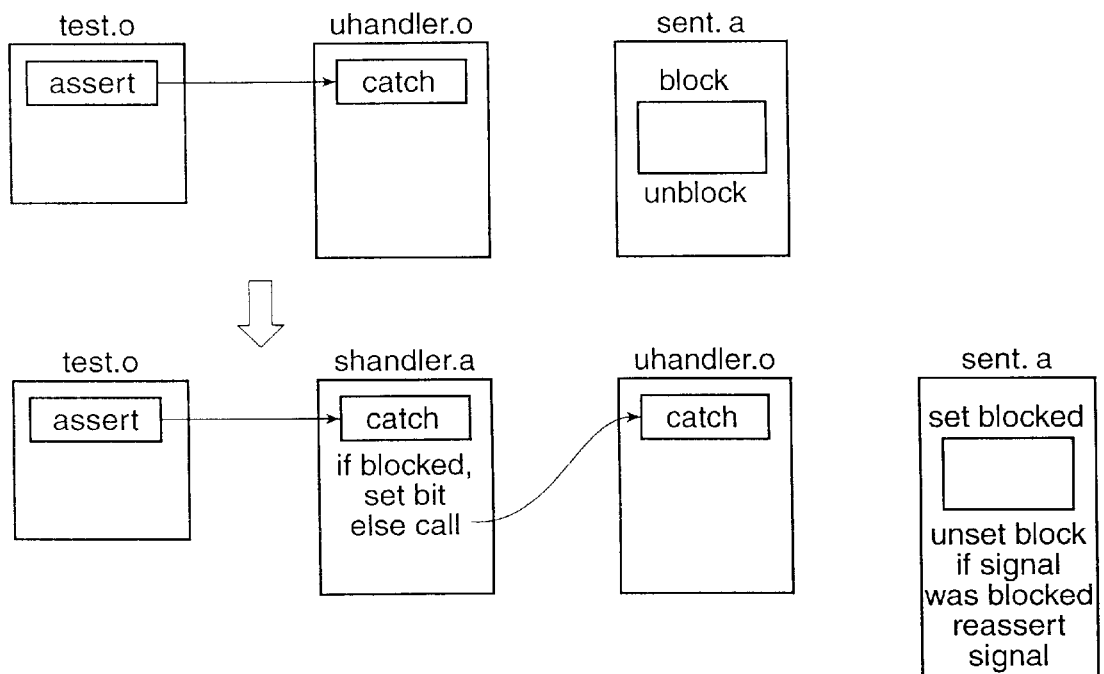

FIG. 7A shows a flow diagram of a method for operation of the recomposer 280. FIG. 7B and FIG. 7C show program structures for use with the method of FIG. 7A.

A method 700 for operation of the recomposer 280 operates to relink calls to certain system functions into calls to replacement functions. At a start point, the recomposer 280 receives the new PIOF module 220' to be recomposed.

At a step 710, the recomposer 280 relinks calls to system routines, so that system routines which perform memory accesses (or other actions to be checkpointed) at the behest of the object module 130 are properly checkpointed. The recomposer 280 recognizes such system routines by reference to a preloaded table of such system routines. FIG. 7B shows program structures for use with this operation.

To perform this step 710, the recomposer 280 replaces each reference to a system routine 751 with a reference to a corresponding replacement routine 752, so that a call instruction 750 referencing the system routine 751 instead references the corresponding replacement routine 752. The replacement routine 752 comprises a checkpoint 753 which calls a checkpoint function to review the arguments to the system routine 751 and determines if any memory access error would occur by making that call, and a call to the original system routine 751.

At a step 720, the recomposer 280 recognizes calls to the system routine dlopen( ), which provides for linking dynamic libraries. The recomposer 280 replaces each reference to dlopen( ), or its equivalent for another operating system, with a reference to a replacement routine 752 dlopen'( ). The replacement routine 752 dlopen'( ) locates the library object module to be dynamically linked and determines whether the library object module has been modified to include checkpoints.

It may occur that the library object module has already been modified to include checkpoints. If so, dlopen'( ) passes the call through to dlopen( ), which dynamically links the library in the normal manner.

Alternatively, it may occur that the library object module has not yet been modified to include checkpoints, or that the library object module has been modified but has been updated without the updated version being so modified (i.e., the library module has a timestamp which is more recent than the modified library module). In this case, before dynamic linking, dlopen'( ) operates to modify the library object module using the OMT program 140, in like manner as modifying the original object module 130. In a preferred embodiment, a message is displayed telling the user of an expected delay for this operation.

At a step 730, the recomposer 280 recognizes calls to the system routine signal( ), which provides for setting up a signal handler named by an application program for a signal named by the application program. The recomposer 280 replaces each refer- ence to signal( ), or its equivalent for another operating system, naming a user's signal handler uhandler( ) 760, with a reference to signal( ) naming a checkpoint signal handler chandler( ) 761. FIG. 7C shows program structures for use with this operation.

The checkpoint signal handler chandler( ) 761 catches the signal, checks to see if a signal_blocked bit (not shown) associated with that signal is set, and if not set, calls the user's signal handler uhandler( ) 760. If the signal-blocked bit is set, the checkpoint signal handler chandler( ) 761 sets a signal_asserted bit (not shown), makes a system call to block the signal, and returns without doing anything more.

When an extensive checkpoint function is executing, it sets the signal_blocked bit, to prevent loss of program control if the signal is asserted. After the checkpoint function returns from execution, it unsets the signal_blocked bit, and if the signal_asserted bit is set, reasserts the same signal so the user's signal handler uhandler( ) 760 will be called to handle the signal. Only extensive checkpoint functions perform this function, as simple checkpoint functions do not need to block signals.

Thus, extensive checkpoint functions can operate without making a relatively time-consuming system call to block signals. If the signal is asserted while the checkpoint function is operating, the checkpoint function is not interrupted, and the signal is merely put off until the checkpoint function is finished. However, the overhead of the system call to block signals is incurred anyway if the signal is caught, because it is considered likely that the signal may be reasserted multiple times, if it is asserted once, while the checkpoint function is operating.

RUN-TIME OPERATION

Figure 8:
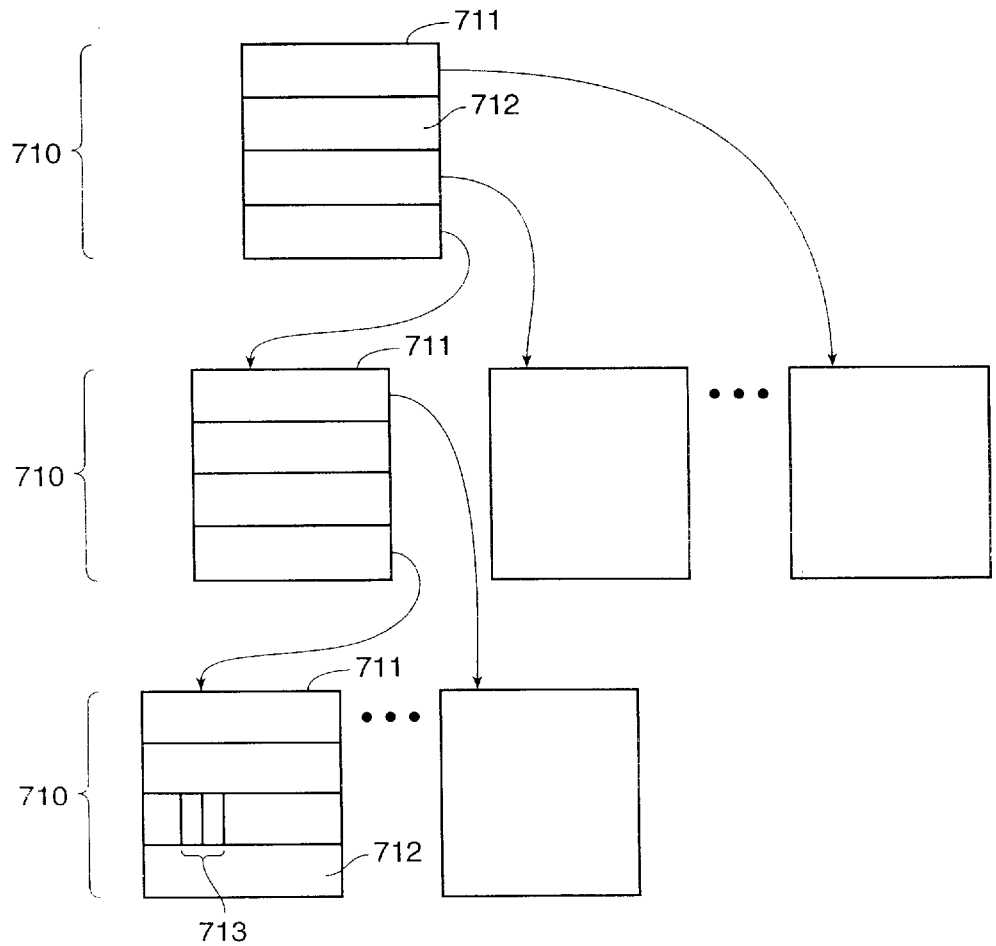
FIG. 8 shows a block diagram of a data structure used for dynamic memory access checking.

FIG. 8 shows a block diagram of a data structure used for dynamic memory access checking.

A bitmap 800 for dynamic memory access checking comprises a tree structure having a plurality of levels 810. A first level 810 comprises a root node 811. At each level 810, each node 811 in that level 810 defines a subtree of inferior nodes 811, and comprises one entry 812 pointing to each such inferior node 811.

Instead of a pointer to an inferior node 811, an entry 812 may comprise a plurality of bit-pairs 813, each indicating read/write access for a region of memory corresponding to that bit-pair 813. The size of the corresponding region of memory depends on the level 810. As each level 810 further subdivides memory, a bit-pair 813 at a level 810 closer to the root node 811 represents a larger region of memory than a bit-pair 813 at a level 810 farther from the root node 811.

Thus, the bit-pairs 813 within each node 811 correspond to regions of memory with upper (most significant) address bits defined for the node 811, further address bits defined for the bit-pair 813 within the node 811, and lowest (least significant) address bits left undefined. The root node 811 defines zero address bits, and each inferior node 811 defines the number of address bits required to distinguish it from each other inferior node 811 depending from the same parent node 811.

In a preferred embodiment, there are exactly two levels 810. The root node 811 has $2^{16}$=64K entries 812, each pointing to a node 811 in the second level 810. Each node 811 in the second level 810 has $2^{16}$=64K entries 812, each having $2^3$=eight bit-pairs 813.

In a preferred embodiment, each bit-pair 813 in the second level 810 coresponds to a single addressable byte, and therefore indicates read/write access for that single addressable byte. Each bit-pair 813 in the first level 810 corresponds to a region of memory which is 64K times larger, and therefore corresponds to a region of 64K contiguous bytes, and indicates read/write access for that 64K region.

An individual bit-pair 813 may be readily accessed by a checkpoint function by indexing within the root node 811 using an offset responsive to the high-order 16 bits of the memory address to be checked, chasing the pointer to the corresponding node 811 for the second level 810, followed by indexing within that node 811 using an offset responsive to the next-most-significant 16 bits of the memory address (the low-order 16 bits in a preferred embodiment), following by selecting the correct individual bit-pair 813 using a mask.

In a preferred embodiment, the mask is selected responsive to the least-significant 3 bits of the memory address, and the size of the memory access being checkpointed. For example, the mask could be selected from a table. If the memory access involved four bytes, the mask would select bit-pairs 813 for all four bytes being accessed at once.

Figure 9:
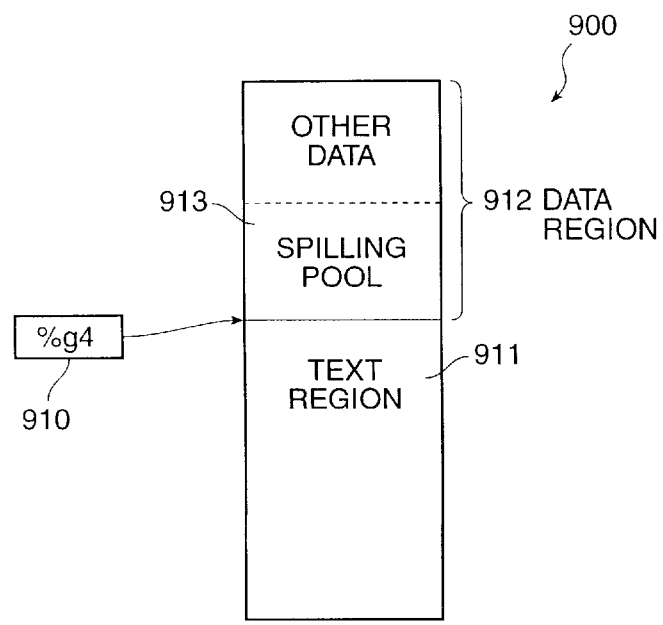
FIG. 9 shows a block diagram of a data structure used for maintaining dynamic information for each thread.

FIG. 9 shows a block diagram of a data structure used for maintaining dynamic information for each thread.

A process linking table 900, for maintaining dynamic information for each thread, is pointed to by a PLT pointer 910, which in a preferred embodiment is the % g4 register.

A text region 911 comprises a set of locations at positive offsets from the PLT pointer 910. The text region 911 comprises small sets of instructions for calling each checkpoint function.

A data region 912 comprises a set of locations at negative offsets from the PLT pointer 910. The data region 912 comprises a spilling pool 913 for spilling registers into, for those instructions 410 which require reallocation of registers.

The data region 912 also comprises other data which specific to the particular thread. Some thread-specific data may be stored on the process stack, which is inherently thread-specific. But, when it is desired not to alter the stack, thread-specific data is stored in the data region 912. For example, when a checkpoint function requires more than two arguments (only two registers are used to point to checkpoint function arguments), the additional arguments are placed in the thread-specific data region 912.

Alternative Embodiments

Although preferred embodiments are disclosed herein, many variations are possible which remain within the concept, scope, and spirit of the invention, and these variations would become clear to those skilled in the art after perusal of this application.

We claim:

1. A method for creating a system for modifying a computer program in an object code format, said system including means for decomposing said object code into a platform-independent object format, means for disassembling said platform-independent object format into a set of platform-independent assembler instructions, means for modifying said platform-independent assembler instructions, means for assembling said modified platform-independent assembler instructions into said platform-independent object format, and means for composing said platform-independent object format into said object code, said method comprising the steps of:

first translating a machine description into means for decomposing said object code into a platform-independent object format and means for composing said platform-independent object format into said object code; and second translating said machine description into means for disassembling said platform-independent object format into a set of platform-independent assembler instructions and means for assembling said modified platform-independent assembler instructions into said platform-independent object format.

2. A method as in claim 1, comprising the steps of:

combining a product of said first translating step with a set of operating system independent code; and combining a product of said second translating step with a set of machine independent code.

3. A method as in claim 1, wherein said step of modifying said platform-independent assembler instructions comprises one of (a) a memory access check, (b) an instruction for profiling what modules take time, what modules are touched, or what data is touched, or (c) a step of translating to a different platform.

4. A method for modifying a computer program in an object code format, said method comprising the steps of:

decomposing said object code into a platform-independent object format;

disassembling said platform-independent object format into a set of platform-independent assembler instructions by:

creating a tag stack by pushing all tags likely to point to instructions for execution onto the tag stack, determining if the tag stack is empty, popping a tag off the tag stack if the tag stack is not determined to be empty, and decoding a next instruction at a location indicated by the popped tag;

modifying said platform-independent assembler instructions;

assembling said modified platform-independent assembler instructions into said platform-independent object format; and composing said platform-independent object format into said object code.

5. The method according to claim 4, the creating step including the following sub-step:

recognizing use of jump tables through searching for a set of relocations having a pattern of a jump table.

6. The method according to claim 4, the decoding step including the following sub-steps:

disassembling a next sequential text word in the next instruction;

pushing the next instruction onto the tag stack if the next instruction is a conditional branch instruction; and backing up to a most recent tag from which text has been disassembled into instructions when the step of disassembling is unsuccessful, the step of backing up further including the step of constructing a placeholder block indicating that the next instruction is data-in-text.

7. The method according to 4, wherein the disassembling step further includes the following sub-step:

creating a linked list of platform-independent assembler instructions, each one of said platform-independent assembler instructions having (a) an instruction type corresponding to an operation code, (b) a set of assembly tags, (c) a set of flags, (d) an encoding for an instruction represented by said element.

8. The method according to 4, the disassembling step including the following sub-step:

compiling a machine description, the machine description describing format and nature of machine instructions for a processor, wherein the machine description comprises a machine description language having a header, a register set description, a list of individual register descriptions, an instruction set branch characteristics description, an instruction set formatting description, and an instruction set properties description.

9. A method for modifying a computer program in an object code format, said method comprising the steps of:

decomposing said object code into a platform-independent object format;

disassembling said platform-independent object format into a set of platform-independent assembler instructions;

modifying said platform-independent assembler instructions by:

receiving a platform independent assembly instruction module, examining a next platform independent assembly instruction to determine if a call to a checkpoint function must be inserted, repeating the examining step until it is determined that a checkpoint function must be inserted, inserting a checkpoint function before the next instruction, determining if registers must be reallocated for use in the next instruction, deciding if inserting the checkpoint function before the next instruction would cause an anomaly and processing the anomaly through providing additional or altered functions not present in the platform independent assembly instruction module;

assembling said modified platform-independent assembler instructions into said platform-independent object format; and composing said platform-independent object format into said object code.

10. The method according to claim 7, the deciding step further including the following sub-steps:

deciding whether a delay slot is present immediately prior to the next instruction;

determining whether a label points to the next instruction; and determining alteration or use of processor condition codes near the next instruction.

11. The method according to claim 9, the inserting step further including the following steps:

attempting to recognize use of global memory by the platform independent assembly instruction module;

attempting to recognize memory initialization by the platform independent assembly instruction module; and attempting to recognize program code for structure copying used by the platform independent assembly instruction module.

12. The method according to claim 9, the inserting step further including the following step:

attempting to optimize the checkpoint function for speed.

13. The method according to claim 1, the attempting to optimize step further including the following sub-steps:

checking for an error; and performing a function call to a checkpoint function if an error is detected.

14. A method for modifying a computer program in an object code format, said method comprising the steps of:

decomposing said object code into a platform-independent object format;

disassembling said platform-independent object format into a set of platform-independent assembler instructions;

modifying said platform-independent assembler instructions;

assembling said modified platform-independent assembler instructions into said platform-independent object format; and composing said platform-independent object format into said object code by:

receiving a platform independent object format module, first relinking each call to a system routine, second relinking a library system routine providing for linking dynamic libraries, and third relinking a signal system routine providing for setting up a signal handler.

15. The method according to claim 14, the first relinking step further including the following sub-steps:

recognizing each system routine by reference to a preloaded table of system routines; and replacing each reference to a system routine with a reference to a corresponding replacement routine, the replacement routine including a checkpoint.

16. The method according to claim 14, the second relinking step further including the following sub-steps:

recognizing calls to the library system routine providing for linking dynamic libraries; and replacing each reference to the library system routine providing for linking dynamic libraries with a library replacement routine.

17. The method according to claim 14, the third relinking step further including the following sub-steps:

recognizing calls to the signal system routine; and signal replacing each reference to the signal system routine with a signal replacement routine having a checkpoint signal handler.

* * * * *